May 21, 1935. L. ROTHHOLZ Re. 19,580

PLATE GLASS TRANSPORTING TRUCK

Original Filed March 23, 1932

INVENTOR
Louis Rothholz
BY
ATTORNEY

UNITED STATES PATENT OFFICE 19,580

PLATE GLASS TRANSPORTING TRUCK

Louis Rothholz, New York, N. Y.

Original No. 1,879,513, dated September 27, 1932, Serial No. 600,599, March 23, 1932. Application for reissue February 18, 1935, Serial No. 8,332

18 Claims. (Cl. 296—3)

This invention relates to new and useful improvements in a plate glass transporting truck.

Heretofore, large sheets of plate glass have been carried horizontally on the bodies of trucks, thereby requiring several persons to carry the glass and load on the truck or to dismount it from the truck and carry the glass to the structure in which it was to be installed. Since glass is extremely fragible, such excessive handling resulted in considerable breakage, thereby increasing the cost of transporting the glass.

In such trucks heretofore used, it was necessary to raise one side of the plate glass above the truck to thereby assume a partially vertical position and then slide the glass off the truck, requiring such trucks to assume a glass unloading position at a considerable distance away from the point at which the plate glass was to be installed.

My improved plate glass transporting truck overcomes these inherent disadvantages by providing means at the sides of the truck for carrying the plate glass thereon in a substantially vertical position, whereby the number of persons required to handle the glass is greatly reduced and whereby the truck may assume an unloading position immediately adjacent the point where the glass is to be installed, thereby reducing handling of the glass and resulting liability of breakage to a minimum.

My invention further contemplates the provision of means for adjusting the glass carrying means to different sizes and quantities of plate glass carried thereon.

The invention has for an object the provision in combination with the chassis of a truck of a plurality of transverse longitudinally spaced support members each having a central portion attached upon the chassis and depending ends upon which frames for supporting the plate glass is supported.

Furthermore, as another object of this invention it is proposed to arrange inner frames permanently attached and sloping towards the center of the truck and outer frame for coaction with the inner frames to hold the plate glass therebetween.

Furthermore, this invention proposes an arrangement whereby the outer frames are adjustable to compensate for different quantities of plate glass held in place.

Furthermore, the invention proposes the provision of a plurality of transverse longitudinally spaced support members for supporting the frames and each comprising a central portion attached upon one side of the truck chassis and connection with an end depending portion for supporting the frame.

The invention further proposes the construction of a device of the class described which is of simple durable construction, dependable in use and efficient in operation, and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 1:
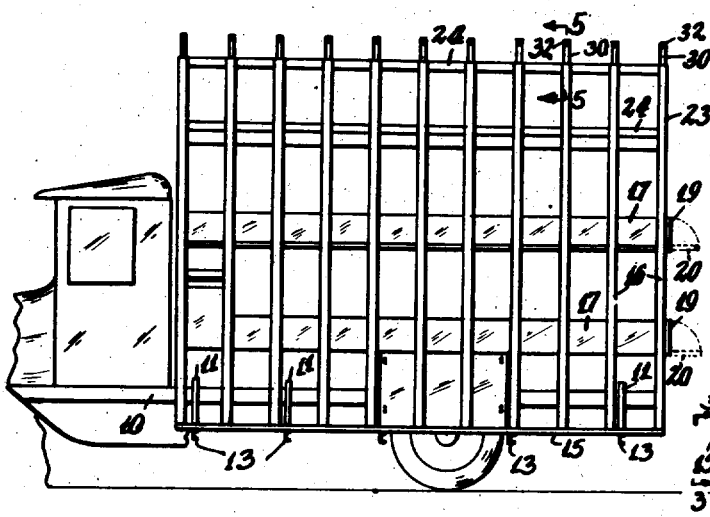
Fig. 1 is a side elevational view of a truck constructed according to this invention.

The plate glass transporting truck is shown to comprise a chassis 10 upon which a plurality of transverse longitudinal spaced support members 11 are secured.

Each of these support members has a central portion 12 extending across the truck the full width and at the ends formed with depending portions 13.

Substantially vertical frames 14 are secured upon the depending ends 13 and are inclined slightly towards each other figuring from the bottom to the top.

Each of the frames 14 has a base element 15 disposed immediately adjacent the depending ends 13 and secured thereon.

The frames 14 are formed from a plurality of vertical boards 16 connected at various heights by transverse boards 17.

Horizontal partitions 18 are connected between the frames 14 and form compartments in which ladders and other tools may be carried.

At the ends of the truck there are hinged boards 19 which form covers for closing the ends of the compartments partially to prevent losing of parts within the compartments.

Dot and dash lines 20 indicate lowered positions of the boards 19.

Each of the frames 14 have top extensions which may assume raised or lowered positions so that the frames may accommodate plate glass of different heights.

Figure 2:
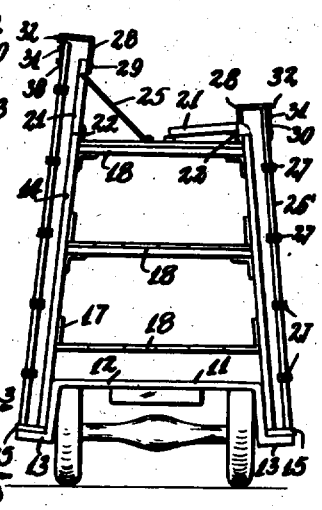
Fig. 2 is a rear elevational view of Fig. 1.
Figure 3:
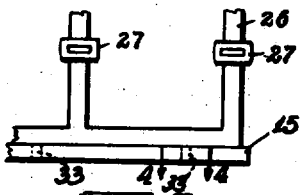
Fig. 3 is a fragmentary elevational view looking in the direction of the line 3—3 of Fig. 2.

In Fig. 2 one of the extensions are shown lowered and the other raised.

These extensions are indicated by reference numerals 21. Each of the extensions 21 are hingedly connected at 22 upon the upper end of the frames 14. The extensions 21 are formed with a plurality of vertical boards 23 joined by horizontal boards 24.

Rods 25 are provided acting between the extensions and the partition 18 for normally holding the extension in the raised position. To lower the extension the screws which hold these rods should be removed.

Outer frames 26 are supported parallel to the frames 14 and are for the purpose of holding plate glass in position between the frames. To facilitate this a plurality of rubber bumping elements 27 are mounted upon the frame 26.

In Fig. 1 the outer frames are not shown in place so that inner parts may be viewed.

In Fig. 2 one large outer frame has been shown upon the side of which the extension 21 is raised and a small outer frame 26' shown upon the side where the extension 21 is lowered.

Support angles 28 are detachably secured upon screws 29 upon the upper ends of the extensions 21 or the upper ends of the frames 14 depending upon whether the extensions 21 are raised or lowered. Each of the angles 28 have adjustable depending front arms 30 which are secured by screws 31 to the upper ends of the outer frames.

More particularly, each arm 30 is threadedly engaged upon a screw 32 rotative upon the angle member 28 and serving to hold the arm 30 in any of the positions mentioned. At the lower ends each of the outer frames are provided with pegs 33 adapted to engage in certain apertures of a plurality of apertures 34 formed upon the base element 15 of the inner frames. The arrangement allows placing of the outer frame so that the lower end is at various distances from the inner frame and by turning the screws 32 the upper end of the outer frame may be correspondingly adjusted.

Figure 4:
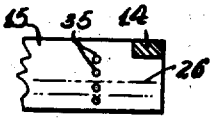
Fig. 4 is a fragmentary sectional view taken on the line 4—4 of Fig. 3.
Figure 5:
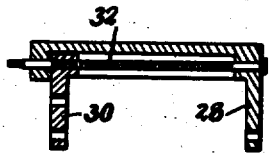
Fig. 5 is a sectional view taken on the line 5—5 of Fig. 1.

Dot and dash lines 26 in Fig. 4 show one position for the outer frame 26. The openings 34 are transverse relative to the member 15 for the purpose stated.

Figure 6:
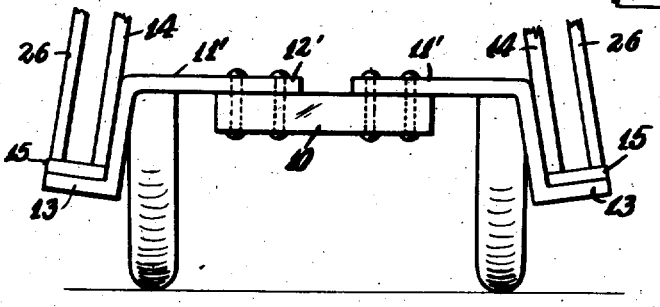
Fig. 6 is a fragmentary view similar to a portion of Fig. 2 but illustrating a modification.

In Fig. 6 a modification of the invention has been disclosed in which a pair of support members 11' are provided on the sides of the chassis for holding the plate glass supporting frames. Each of the support members 11' comprise a portion 12' for attachment upon the side of the chassis 10 and having a depending end 13 upon which the frames are mounted.

In operation the panes of glass may be slipped in between the frames 14 and 26 from the rear of the truck or the front frames may be temporarily removed during the loading of the plate glass.

The panes of glass are rested against the inner frames 14. If the panes are of small height the extensions 21 may be lowered and if of larger height, the extensions 21 placed into the raised positions.

The outer frames 26 may be adjusted relative to the inner frames for the proper guarding of the plate glass to prevent rattling which may cause breakage. Tools, ladders and other articles may be placed upon the partitions 18.

While I have shown and described the preferred embodiment of my invention, it is to be understood that I do not limit myself to the precise construction herein disclosed and the right is reserved to all changes and modifications coming within the scope of the invention as defined in the appended claims.

I claim:

1. In combination with the chassis of a truck, a plurality of transverse longitudinally spaced support members each having a central portion attached upon the chassis and depending ends at the sides of the chassis, substantially vertical frames secured at inclinations towards each other upon said depending ends, horizontal partitions between said frames forming compartments of the truck, hinged extensions upon said frames, means for holding said extension in the same plane with the frames, support angles adapted for attachment upon the upper ends of said extensions or the upper ends of said frames and having adjustable arms, and outer frames attached upon said arms and adjustably held in the lower ends upon said depending ends.

2. In combination with the chassis of a truck, a plurality of transverse longitudinally spaced support members each having a central portion attached upon the chassis and depending ends at the sides of the chassis, substantially vertical frames secured at inclinations towards each other upon said depending ends, horizontal partitions between said frames forming compartments of the truck, hinged extensions upon said frames, means for holding said extension in the same plane with the frames, support angles adapted for attachment upon the upper ends of said extensions or the upper ends of said frames and having adjustable arms, and outer frames attached upon said arms and adjustably held in the lower ends upon said depending ends, each of said transverse support members being from channel iron.

3. In combination with the chassis of a truck, a plurality of transverse longitudinally spaced support members each having a central portion attached upon the chassis and depending ends at the sides of the chassis, substantially vertical frames secured at inclinations towards each other upon said depending ends, horizontal partitions between said frames forming compartments of the truck, hinged extensions upon said frames, means for holding said extension in the same plane with the frames, support angles adapted for attachment upon the upper ends of said extensions or the upper ends of said frames and having adjustable arms, and outer frames attached upon said arms and adjustably held in the lower ends upon said depending ends, each of said substantially vertical inner frames being formed from a plurality of spaced vertical boards connected by horizontal boards.

4. In combination with the chassis of a truck, a plurality of transverse longitudinally spaced support members each having a central portion attached upon the chassis and depending ends at the sides of the chassis, substantially vertical frames secured at inclinations towards each other upon said depending ends, horizontal partitions between said frames forming compartments of the truck, hinged extensions upon said frames, means for holding said extension in the same plane with the frames, support angles adapted for attachment upon the upper ends of said extensions or the upper ends of said frames and having adjustable arms, and outer frames attached upon said arms and adjustably held in the lower ends upon said depending ends, a base board being connected upon the lower ends of said inner frames and form supports for the lower ends of the outer frames.

5. In combination with the chassis of a truck, a plurality of transverse longitudinally spaced support members each having a central portion attached upon the chassis and depending ends at the sides of the chassis, substantially vertical frames secured at inclinations towards each other upon said depending ends, horizontal partitions between said frames forming compartments of the truck, hinged extensions upon said frames, means for holding said extension in the same plane with the frames, support angles adapted for attachment upon the upper ends of said extensions or the upper ends of said frames and having adjustable arms, and outer frames attached upon said arms and adjustably held in the lower ends upon said depending ends, hinged boards being arranged transversely upon the back of said inner frames to partially close the compartments formed by the horizontal partitions.

6. In combination with the chassis of a truck, a plurality of transverse longitudinally spaced support members each having a central portion attached upon the chassis and depending ends at the sides of the chassis, substantially vertical frames secured at inclinations towards each other upon said depending ends, horizontal partitions between said frames forming compartments of the truck, hinged extensions upon said frames, means for holding said extension in the same plane with the frames, support angles adapted for attachment upon the upper ends of said extensions or the upper ends of said frames and having adjustable arms, and outer frames attached upon said arms and adjustably held in the lower ends upon said depending ends, said means for holding the hinged extensions comprising rods attached between the extensions at one of said partitions.

7. In combination with the chassis of a truck, a plurality of transverse longitudinally spaced support members each having a central portion attached upon the chassis and depending ends at the sides of the chassis, substantially vertical frames secured at inclinations towards each other upon said depending ends, horizontal partitions between said frames forming compartments of the truck, hinged extensions upon said frames, means for holding said extension in the same plane with the frames, support angles adapted for attachment upon the upper ends of said extensions or the upper ends of said frames and having adjustable arms, and outer frames attached upon said arms and adjustably held in the lower ends upon said depending ends, said adjustable arms being threadedly engaged upon the screw rotatively supported on said angles.

8. In combination with the chassis of a truck, a plurality of transverse longitudinally spaced support members each having a central portion attached upon the chassis and depending ends at the sides of the chassis, substantially vertical frames secured at inclinations towards each other upon said depending ends, horizontal partitions between said frames forming compartments of the truck, hinged extensions upon said frames, means for holding said extension in the same plane with the frames, support angles adapted for attachment upon the upper ends of said extensions or the upper ends of said frames and having adjustable arms, and outer frames attached upon said arms and adjustably held in the lower ends upon said depending ends, pegs projecting from the lower ends of the outer frames being engageable in certain of a plurality of apertures formed in a base board mounted upon said depending ends and constituting means for holding the lower ends of said outer frames in different positions.

9. In combination with the chassis of a truck, a plurality of transverse longitudinally spaced support members each having a portion attached upon the chassis and a depending end at the side of the chassis, substantially vertical frames secured at inclinations towards each other upon said depending ends, horizontal partitions between said frames forming compartments of the truck, hinged extensions upon said frames, means for holding said extensions in the same plane with the frames, support angles adapted for attachment upon the upper ends of said extensions or the upper ends of said frames and having adjustable arms, and outer frames attached upon said arms and adjustably held in the lower ends upon said depending ends.

10. In combination with the chassis of a truck, a plurality of transverse longitudinally spaced support members each having a portion attached upon the chassis and a depending end at the side of the chassis, substantially vertical frames secured at inclinations towards each other upon said depending ends, horizontal partitions between said frames forming compartments of the truck, hinged extensions upon said frames, means for holding said extensions in the same plane with the frames, support angles adapted for attachment upon the upper ends of said extensions or the upper ends of said frames and having adjustable arms, and outer frames attached upon said arms and adjustably held in the lower ends upon said depending ends, said transverse members being dependently arranged upon the opposite sides of said chassis.

11. The combination with the chassis of a truck, of substantially vertical frames adapted to retain rigid sheets therebetween, means for supporting said frames on the truck, means for adjusting the dimensions of the frames, and a compartment arranged on the truck between the frames and formed thereby.

12. A plate glass transporting truck, comprising a chassis, means for retaining a sheet of glass arranged on the chassis and comprising an inner frame arranged at an inclination to the chassis and an outer frame adjacent the inner frame and means for adjusting the frames.

13. The combination with the chassis of a truck of a rigid sheet transporting body comprising an inwardly inclined frame arranged at the side of the truck, means on the frame for securing rigid sheets thereon and means arranged on the frame for adjusting said frame to the rigid sheets secured thereon.

14. The combination with the chassis of a truck of a rigid sheet transporting body comprising frames arranged at the sides of the truck at inclinations towards each other, hinged means on the frames arranged to adjust the frames and horizontal partitions arranged therebetween to form a compartment.

15. In a plate glass transporting truck, a substantially vertical glass retaining frame adjacent the side of the truck and secured thereto, comprising an inner frame provided with means for supporting glass depending therefrom and an outer frame adjacent the inner frame and means on the glass retaining frame for adjusting the outer frame to compensate for different quantities of glass retained on the glass retaining frame.

16. In a plate glass transporting truck, a slightly inwardly inclined glass retaining frame adjacent the side of the truck and secured thereon, comprising an inner structure provided with glass supporting means depending therefrom, an outer structure adjacent the inner structure and cooperating therewith to retain glass therebetween on the frame and means on the frame for adjustably compensating the frame for different quantities of glass retained thereon.

17. In a plate glass transporting truck, a glass retaining frame arranged on the side of the truck at a slight inclination thereto and provided with an inner and outer structure to hold glass therebetween, means adjustably secured to the inner structure for extending said structure, means arranged on the outer structure for relatively extending said outer structure and support angles connecting the inner and outer frames and arranged thereon or the extensions thereto.

18. In combination with the chassis of a truck, a plurality of longitudinally spaced support members arranged on the chassis, substantially vertical frames secured at inclinations towards each other upon said supports, horizontal partitions between said frames forming compartments of the truck, extensions moveably arranged upon said frames and adapted to be restrained in alignment with the frames, outer frames adjustably arranged upon the supports, and support angles adapted for attachment upon the upper ends of said extensions or the upper ends of said frames and secured to the outer frames.

LOUIS ROTHHOLZ.